(12) United States Patent
Rakowski et al.

(10) Patent No.: US 11,029,465 B1
(45) Date of Patent: Jun. 8, 2021

(54) MICRO-RING MODULATOR

(71) Applicant: GLOBALFOUNDRIES U.S. Inc., Santa Clara, CA (US)

(72) Inventors: Michal Rakowski, Ballston Spa, NY (US); Yusheng Bian, Ballston Lake, NY (US); Ajey Poovannummoottil Jacob, Watervliet, NY (US); Steven M. Shank, Jericho, VT (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/832,023

(22) Filed: Mar. 27, 2020

(51) Int. Cl.
*G02B 6/28* (2006.01)
*G02B 6/293* (2006.01)
*G02B 6/02* (2006.01)

(52) U.S. Cl.
CPC .......... *G02B 6/02361* (2013.01); *G02B 6/28* (2013.01); *G02B 6/29338* (2013.01)

(58) Field of Classification Search
CPC .................. G02B 6/29338; G02B 6/29341
See application file for complete search history.

(56) References Cited

U.S. PATENT DOCUMENTS

| | | | | |
|---|---|---|---|---|
| 5,926,496 A * | 7/1999 | Ho | ........................ | B82Y 20/00 372/92 |
| 8,805,130 B2 * | 8/2014 | Lipson | ............... | G02B 6/12007 385/14 |
| 8,897,606 B2 * | 11/2014 | Asghari | ................ | G02F 1/2257 385/2 |
| 9,690,122 B2 * | 6/2017 | Kamei | .................... | G02F 1/025 |
| 2020/0173843 A1 * | 6/2020 | Westerveld | ........ | G01D 5/35329 |

OTHER PUBLICATIONS

Giewont et al., "300-mm Monolithic Silicon Photonics Foundry Technology," IEEE Journal of Selected Topics in Quantum Electronics, 25:8200611, Sep./Oct. 2019.
Herkommer et al., "A chip-based silicon nitride platform for mid-infrared nonlinear photonics," CLEO 2017.
Rakowski et al., "45nm CMOS-Silicon Photonics Monolithic Technology (45CLO) for next-generation, low power and high speed optical interconnects".
Shen et al., "Fabrication of depletion type micro-ring modulator with high extinction ratio and high coupling quality factor," MATEC Web of Conference, 139:00066, 2017.
Wei et al., "Silicon-nitride photonic circuits interfaced with monolayer MoS2," Jun. 5, 2015.
Yao et al., "Integrated Silicon Photonic Microresonators: Emerging Technologies," IEEE Journal of Selected Topics in Quantum Electronics, 24: 5900324, Nov./Dec. 2018.

* cited by examiner

*Primary Examiner* — Omar R Rojas
(74) *Attorney, Agent, or Firm* — Francois Pagette; Hoffman Warnick LLC

(57) ABSTRACT

One illustrative device disclosed herein includes a micro-ring modulator that comprises an inner ring, an outer ring and a doped waveguide ring positioned between the inner ring and the outer ring. The device also includes an upper bus waveguide that is positioned vertically above at least a portion of the doped waveguide ring and at least a portion of the outer ring.

15 Claims, 13 Drawing Sheets

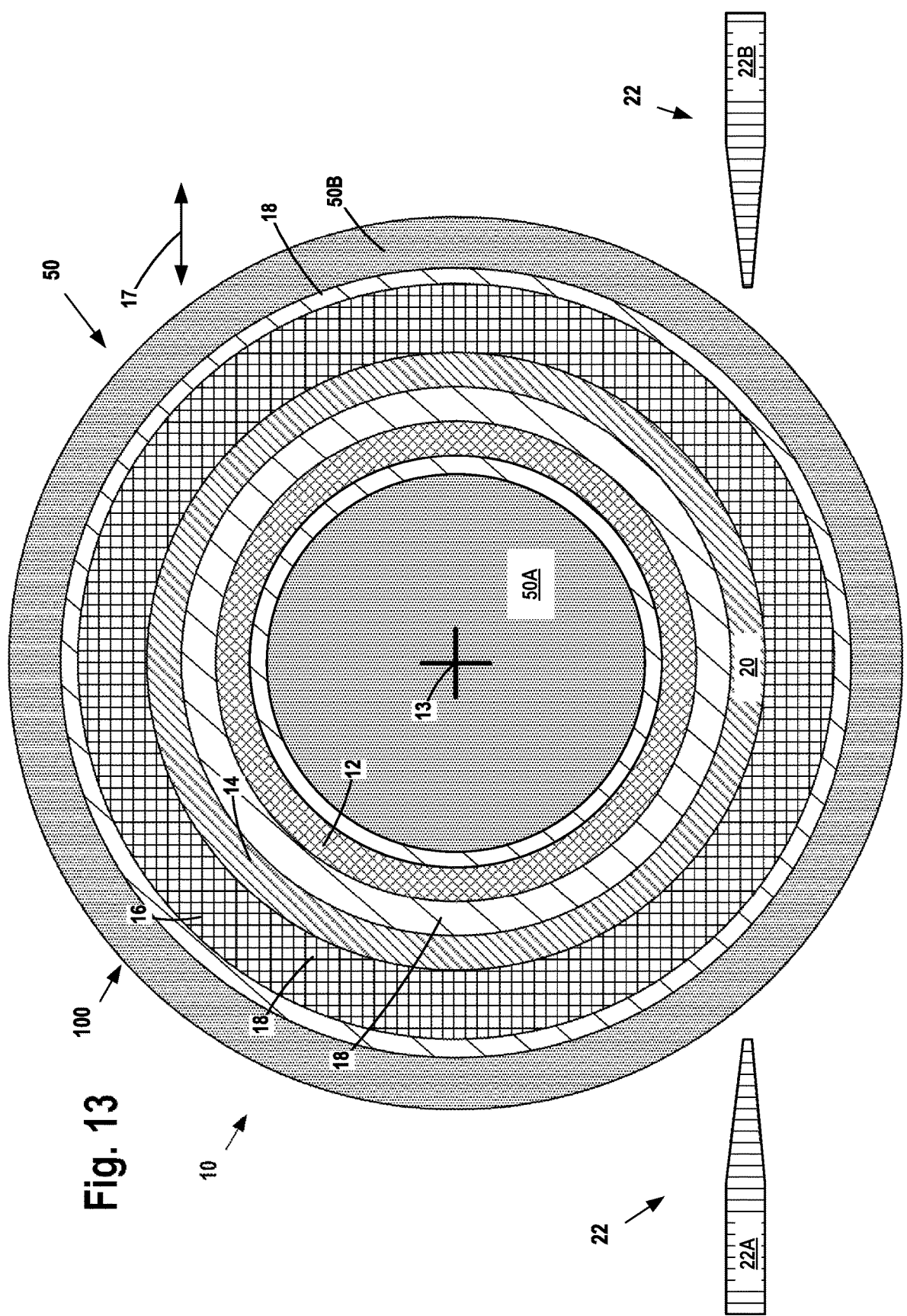

MICRO-RING MODULATOR

BACKGROUND

Field of the Invention

The present disclosure generally relates to various novel embodiments of a structure comprising a micro-ring modulator and an upper bus waveguide and various methods of making such a structure.

Description of the Related Art

A need for greater bandwidth in fiber optic network links is widely recognized. The volume of data transmissions has seen a dramatic increase in the last decade. This trend is expected to grow exponentially in the near future. As a result, there exists a need for deploying an infrastructure capable of handling this increased volume and for improvements in system performance. Fiber optics communications have gained prominence in telecommunications, instrumentation, cable TV, network, and data transmission and distribution.

Photonics chips are used in many applications. A photonics chip integrates optical components, such as waveguides, couplers, photodetectors, etc., and electronic components, such as integrated circuits comprised of CMOS-based field-effect transistors, into a unified platform. The optical components must generally be able to perform at least the functions of light coupling, light propagation, light absorption and conversion of light to an electrical current. The optical components are formed in a photonics region of the product while the CMOS-based integrated circuits are formed in a CMOS region of the product.

One of the important aspects of optical systems is modulator design. Ring-resonator-based devices have become popular for a variety of applications in silicon photonic devices, such as signal modulation, switching and filtering. Compared to other forms of resonators (e.g., Mach Zhender modulators) ring-resonator-based silicon modulators generally consume less power, have a higher modulation efficiency and have a smaller footprint.

The present disclosure is generally directed to various novel embodiments of a structure comprising a micro-ring modulator and an upper bus waveguide and various methods of making such a structure.

SUMMARY

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present disclosure is directed to various novel embodiments of a structure comprising a micro-ring modulator and an upper bus waveguide and various methods of making such a structure. One illustrative device disclosed herein includes a micro-ring modulator that comprises an inner ring, an outer ring and a doped waveguide ring positioned between the inner ring and the outer ring. The device also includes an upper bus waveguide that is positioned vertically above at least a portion of the doped waveguide ring and at least a portion of the outer ring.

BRIEF DESCRIPTION OF THE DRAWINGS

The disclosure may be understood by reference to the following description taken in conjunction with the accompanying drawings, in which like reference numerals identify like elements, and in which:

FIGS. 1-13 depict various novel embodiments of a structure comprising a micro-ring modulator and an upper bus waveguide and various methods of making such a structure. The drawings are not to scale.

Figure 1:
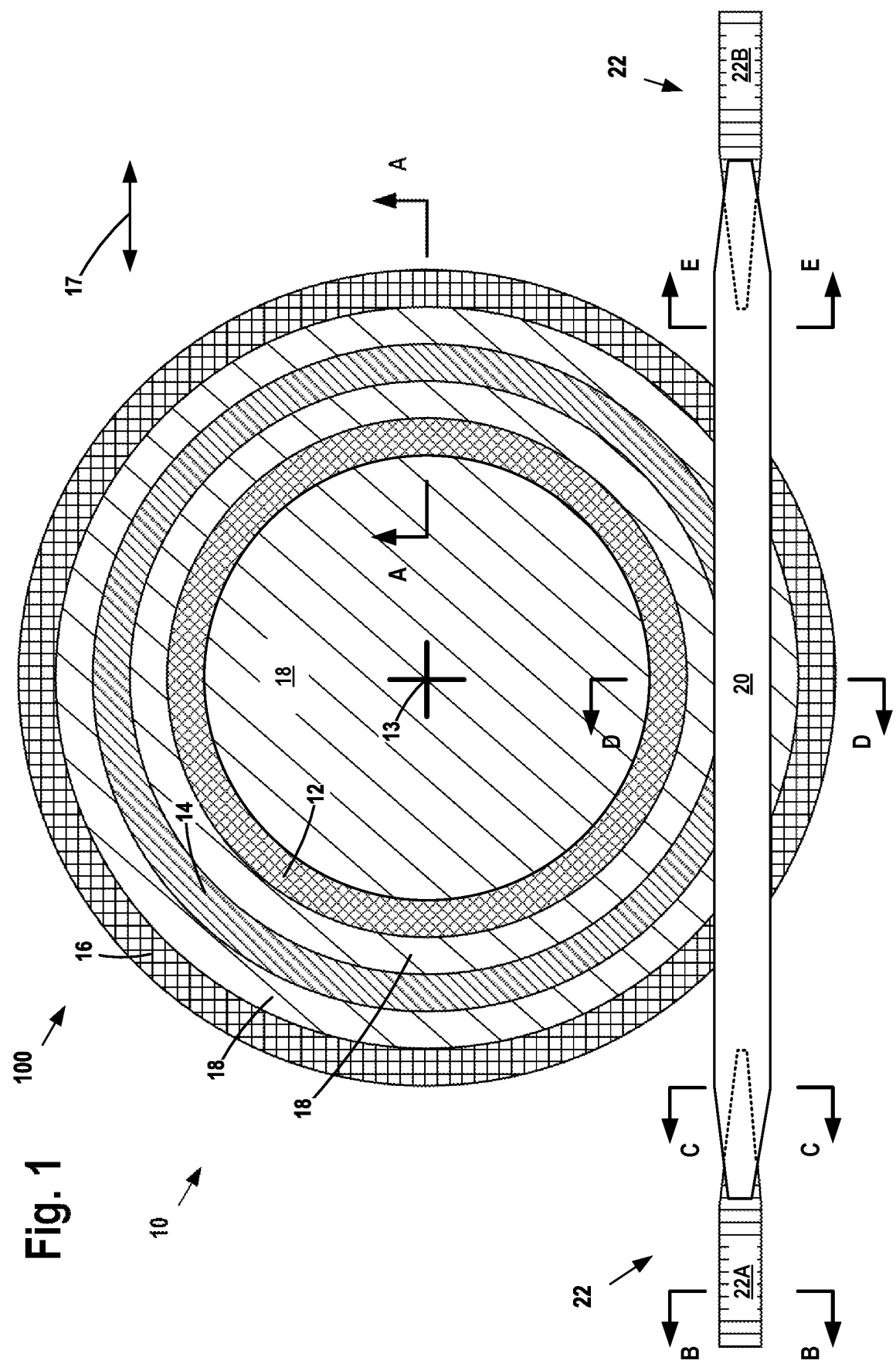

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the under-standing of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase. As will be readily apparent to those skilled in the art upon a complete reading of the present application, the presently disclosed method may be applicable to a variety of products, including, but not limited to, logic products, memory products, etc. With reference to the attached figures, various illustrative embodiments of the methods and devices disclosed herein will now be described in more detail. The various components, structures and layers of material depicted herein may be formed using a variety of different materials and by performing a variety of known process operations, e.g., chemical vapor deposition (CVD), atomic layer deposition (ALD), a thermal growth process, spin-coating techniques, masking, etching, etc. The thicknesses of these various layers of material may also vary depending upon the particular application.

FIGS. 1-13 depict various novel embodiments of a structure 100 that represents an active modulator design comprising a micro-ring modulator 10 (with a PN junction phase shifter implemented in silicon), a lower waveguide 22 and an upper bus waveguide 20 and various methods of making such a structure 100. FIG. 1 is a simplistic plan view of the structure 100 with various layers of insulating material as well as contact or metallization structures omitted for sake of clarity. As shown in FIG. 1, the lower waveguide 22 comprises a first segment 22A and a second segment 22B that are spaced apart from one another.

Figure 2:
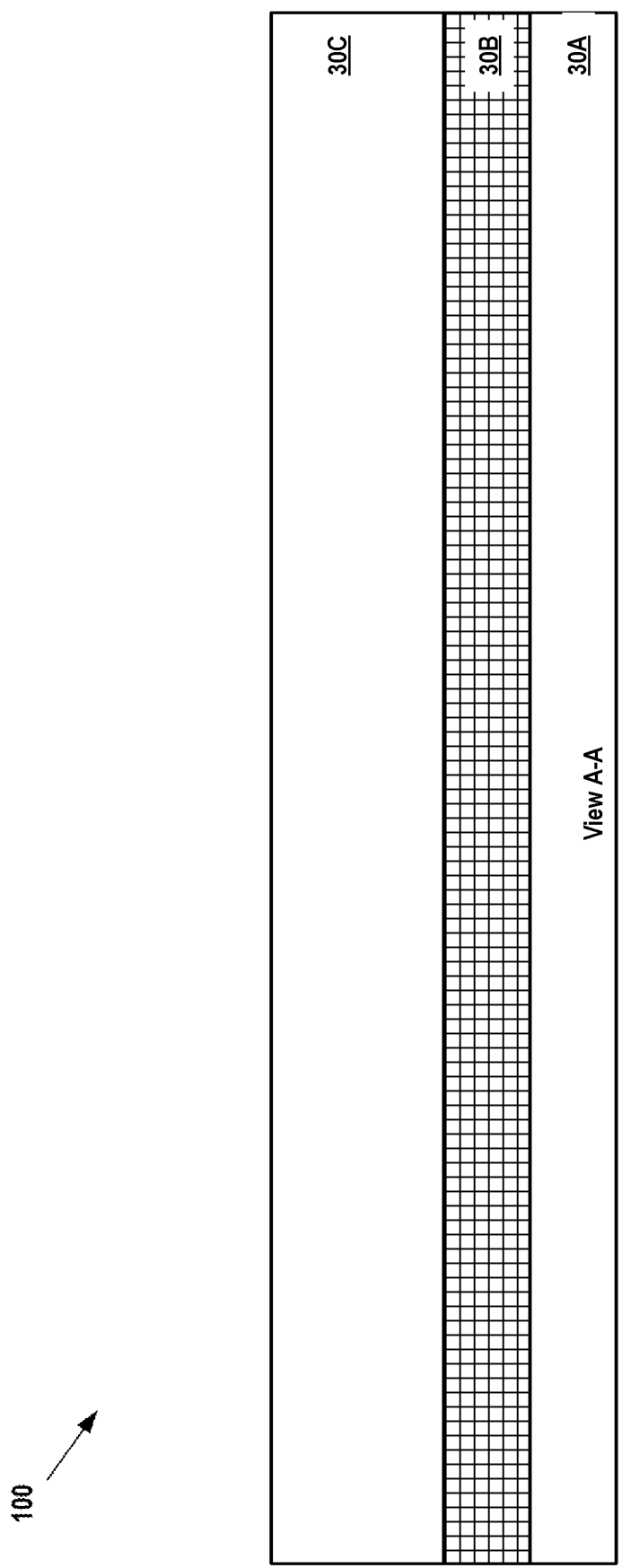

With reference to FIG. 2, in the examples depicted herein, the structure 100 will be formed above a semiconductor substrate 30. The substrate 30 may have a variety of configurations, such as a semiconductor-on-insulator (SOI) shown in FIG. 2. Such an SOI substrate 30 includes a base semiconductor layer 30A, a buried insulation layer 30B positioned on the base semiconductor layer 30A and an active semiconductor layer 30C positioned above the buried insulation layer 30B, wherein the micro-ring modulator 10 will be formed in the active semiconductor layer 30C. In other applications, the substrate 30 may be made of silicon or it may be made of semiconductor materials other than silicon. In some cases, the base semiconductor layer 30A and the active semiconductor layer 30C may be made of the same semiconductor material, but that may not be the case in all situations. Thus, the terms "substrate" or "semiconductor substrate" should be understood to cover all semiconductor materials and all forms of such materials.

The various cross-sectional views of the illustrative structure 100 that are shown in FIGS. 2-8 are taken where indicated in FIG. 1. More specifically, the view A-A is a cross-sectional view taken through the micro-ring modulator 10, the view B-B is a cross-sectional view taken through the lower waveguide 22, the view C-C is a cross-sectional view taken through the lower waveguide 22 and the upper bus waveguide 20, the view D-D is a cross-sectional view taken through the micro-ring modulator 10 and the upper bus waveguide 20 and the view E-E is a cross-sectional view taken through the upper bus waveguide 20.

With reference to FIG. 1, in the depicted example, the micro-ring modulator 10 comprises a doped waveguide ring 14, an inner ring 12 and, an outer ring 16. The inner ring 12 and the outer ring 16 are provided so as to enable electrical access to the doped waveguide ring 14. The center 13 of the various rings is also depicted in FIG. 1. Of course, as will be appreciated by those skilled in the art after a complete reading of the present application, the micro-ring modulator 10 may have other configurations than the illustrative circular rings shown in FIG. 1. For example, when viewed from above, the "rings" of the micro-ring modulator 10 may have an oval configuration, a racetrack-shaped configuration, etc. The physical dimensions of the inner ring 12, the doped waveguide ring 14 and the outer ring 16, i.e., the radial thickness in the direction 17 shown in FIG. 1 as well as the vertical thickness (into and out of the plane of the drawing in FIG. 1), may all vary depending upon the particular application. Two or more of the inner ring 12, the doped waveguide ring 14 and the outer ring 16 may have the same physical dimensions in some applications, but that may not be the case in other applications.

Figure 3:
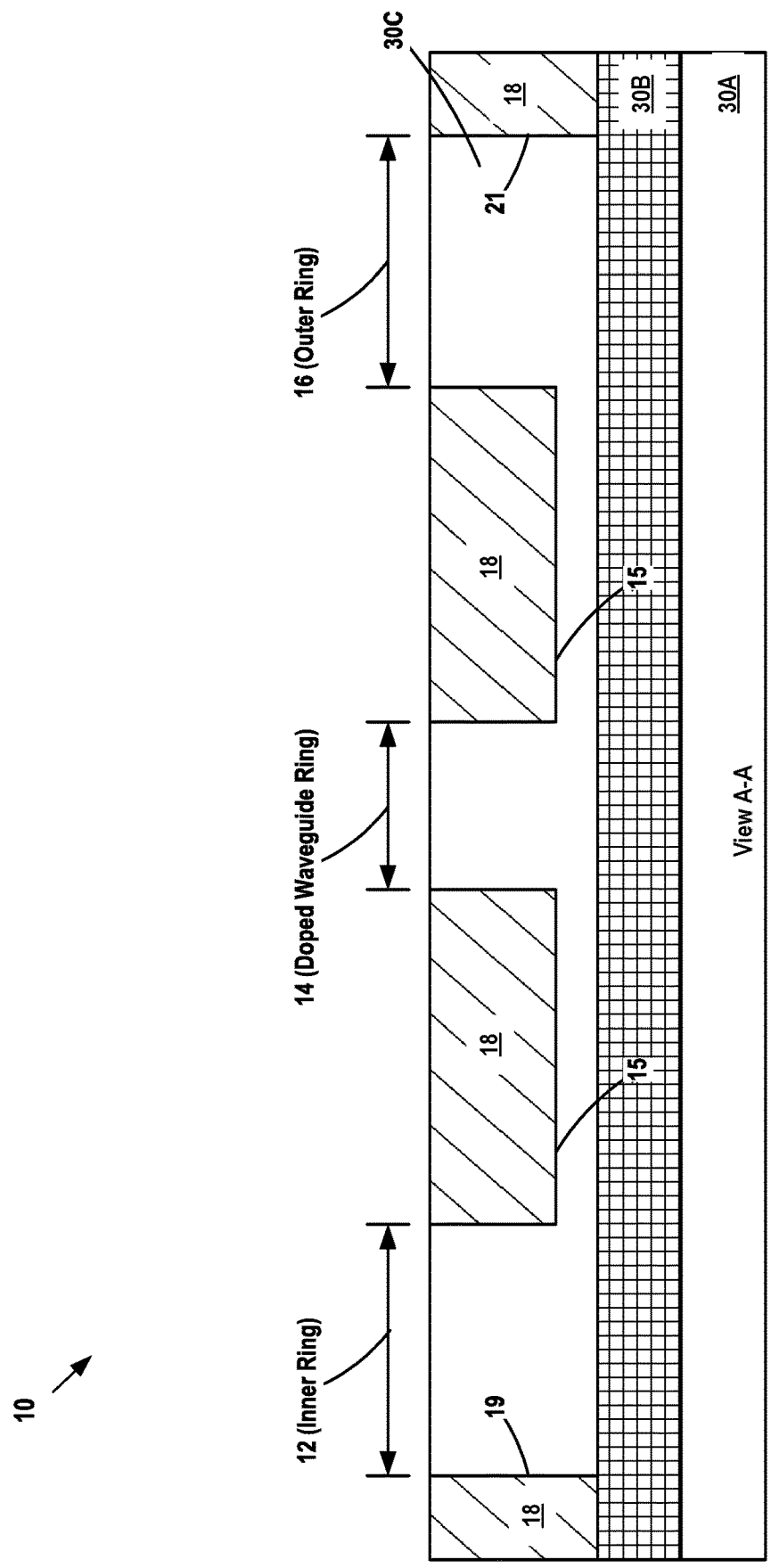
Figure 4:
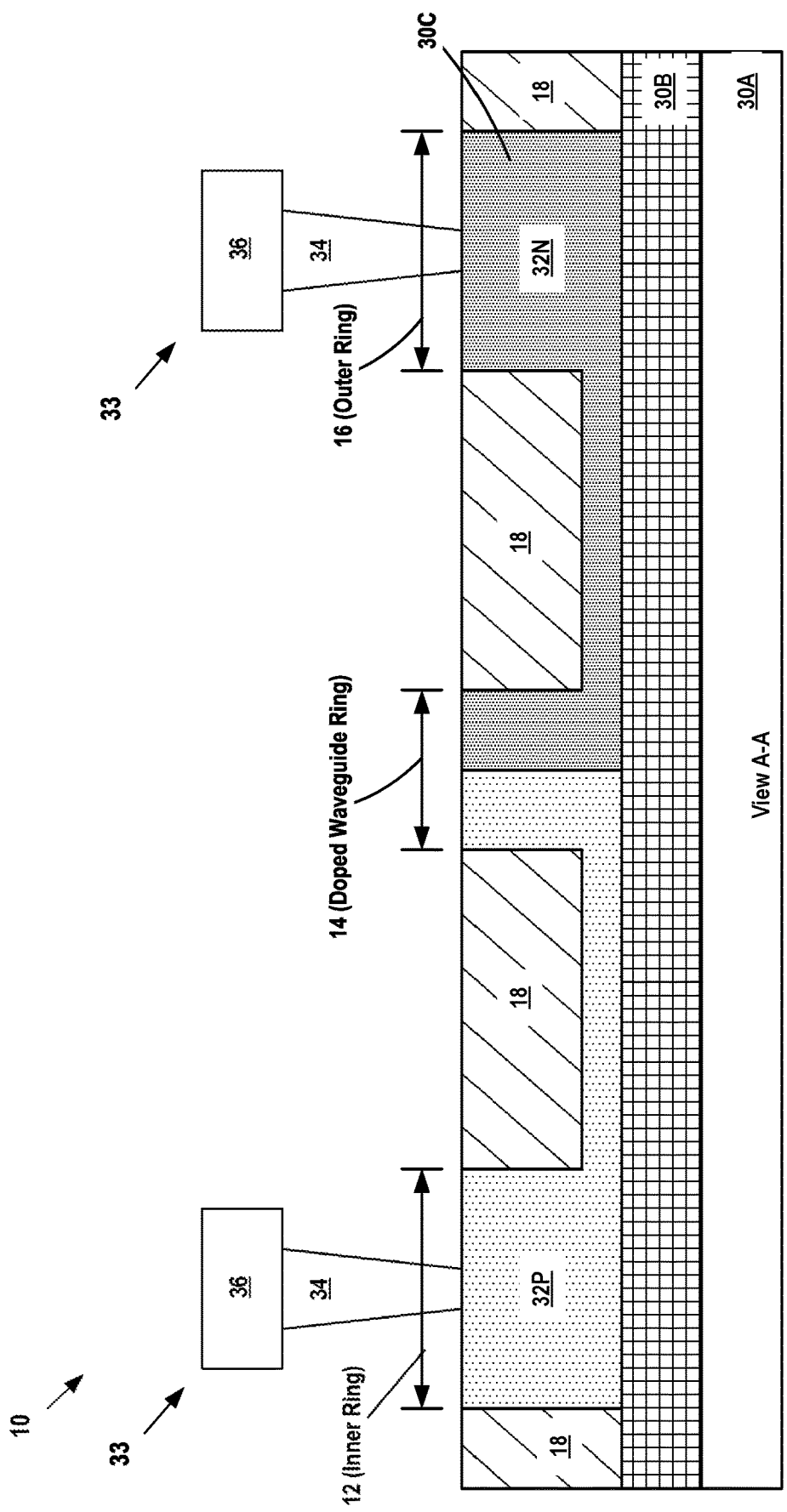

FIGS. 2-4 depict one illustrative process flow for forming the micro-ring modulator 10 shown in FIG. 1. FIG. 2 is a cross-sectional view of the illustrative substrate 30 prior to beginning fabrication of the micro-ring modulator 10. The thickness of the active semiconductor layer 30C may vary depending upon the particular application. In one illustrative embodiment, based upon current-day technology, the active semiconductor layer 30C may have a thickness of about 150-300 nm.

FIG. 3 depicts the micro-ring modulator 10 after several processing operations were performed. As described more fully below, the illustrative micro-ring modulator 10 disclosed herein comprises an N-doped region 32N and a P-doped region 32P (collectively referenced using the numeral 32). However, the doped regions 32 are not depicted in FIG. 3 so as to show the steps of forming the inner ring 12, the doped waveguide ring 14 and the outer ring 16 in the active semiconductor layer 30C. First, in one illustrative process flow, a first patterned etch mask (not shown), e.g., a patterned layer of photoresist, was formed above the active semiconductor layer 30C. The first patterned etch mask covers the area where the micro-ring modulator 10 will be formed. Thereafter, an etching process was performed to remove the entire vertical thickness of the exposed portions of the active semiconductor layer 30C (and expose the buried insulation layer 30B) to define the inner surface 19 of the inner ring 12 and the outer surface 21 of the outer ring 16. Next, the first patterned etch mask was removed. At that point, a second patterned etch mask was formed that exposes the portion of the area of the micro-ring modulator 10 wherein it is desired to form circular-shaped trenches 15 that have a depth that is less than the vertical thickness of the active semiconductor layer 30C. Thereafter, an etching process was performed to form the trenches 15 in the active semiconductor layer 30C. In one illustrative example, the residual thickness of the active semiconductor layer 30C below the trenches 15 may be about 40-100 nm. Next, the second patterned etch mask may be removed. At that point, a layer of insulating material 18, e.g., silicon dioxide, was deposited on the substrate 30 and a CMP and/or etch-back process operation was performed to remove excess amounts of the insulating material 18 positioned outside of the trenches 15. Note that, in other examples, the inner ring 12 and outer ring 16 may be formed such that they have a vertical thickness similar to that of the doped waveguide ring 14, i.e., the inner ring 12 and the outer ring 16 may be formed by etching the trenches 15 into the active semiconductor layer 30C. However, building contact structures to the inner ring 12 and the outer ring 16 in such a manner may require additional process development and may also result in higher resistance due to the relatively larger size of contact.

FIG. 4 depicts the micro-ring modulator 10 with the N-doped region 32N and the P-doped region 32P formed therein. Also depicted in FIG. 4 are illustrative conductive structures 33 (a conductive contact 34 and a conductive line 36) that are conductively coupled to the doped regions 32. Several conductive structures 33 will be formed to contact each of the inner ring 12 and the outer ring 16. The conductive structures 33 are positioned in various layers of insulating material (not shown) as will be understood by those skilled in the art. In the depicted example, the P-doped region 32P is positioned in the inner ring 12 and in a portion of the doped waveguide ring 14, while the N-doped region 32N is positioned in the outer ring 16 and a portion of the doped waveguide ring 14. Of course, in other embodiments, the positions of the N-doped region 32N and the P-doped region 32P may be reversed. In one illustrative process flow, the doped regions 32 may be formed in the active semiconductor layer 30C prior to patterning the active semiconductor layer 30C, as described above in connection with FIG. 3. In one illustrative embodiment, the doped regions 32 may have a dopant concentration that falls within the range of about 10e16-10e19 ions/cm$^3$. The location of the peak concentration of dopant atoms in the doped regions 32 may also vary depending upon the particular application. The N-doped region 32N may be doped with any species of N-type dopant, e.g., arsenic, phosphorus, etc. The P-doped region 32P may be doped with any species of P-type dopant, e.g., boron, boron difluoride, etc.

As noted above, FIG. 5 reflects the cross-sectional view B-B—a cross-sectional view taken through the lower waveguide 22. As shown therein, in one illustrative embodiment, the lower waveguide 22 was etched from the material of the active semiconductor layer 30C. The physical dimensions of the lower waveguide 22, e.g., the lateral width 22L, the vertical thickness as well as the configuration of the lower waveguide 22 when viewed from above, may vary depending upon the particular application. For example, the portions of the lower waveguide 22 positioned vertically below the upper bus waveguide 20 have a tapered configuration, as shown by the dashed lines in FIG. 1. In one illustrative example, based upon current-day technology, the lateral width 22L of the lower waveguide 22 may be about 150-300 nm. Note that the presence of lower waveguide sections 22A and 22B is optional. The structure 100 defining the ring modulator 10 can be used with only the upper bus waveguide 20. Also note that the lower waveguide 22 need not have the tapered ends in all applications.

Figure 5:
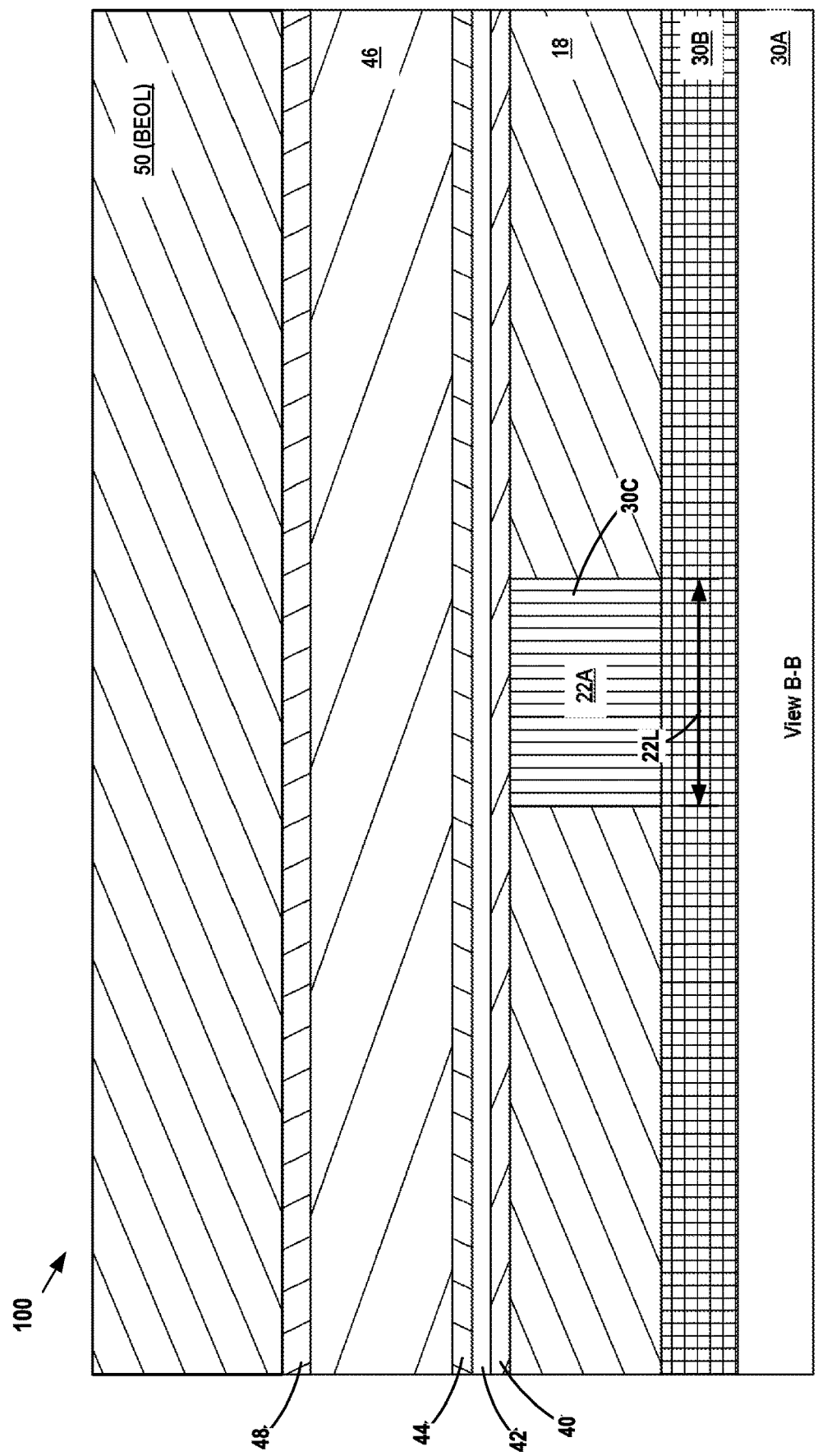
Figure 6:
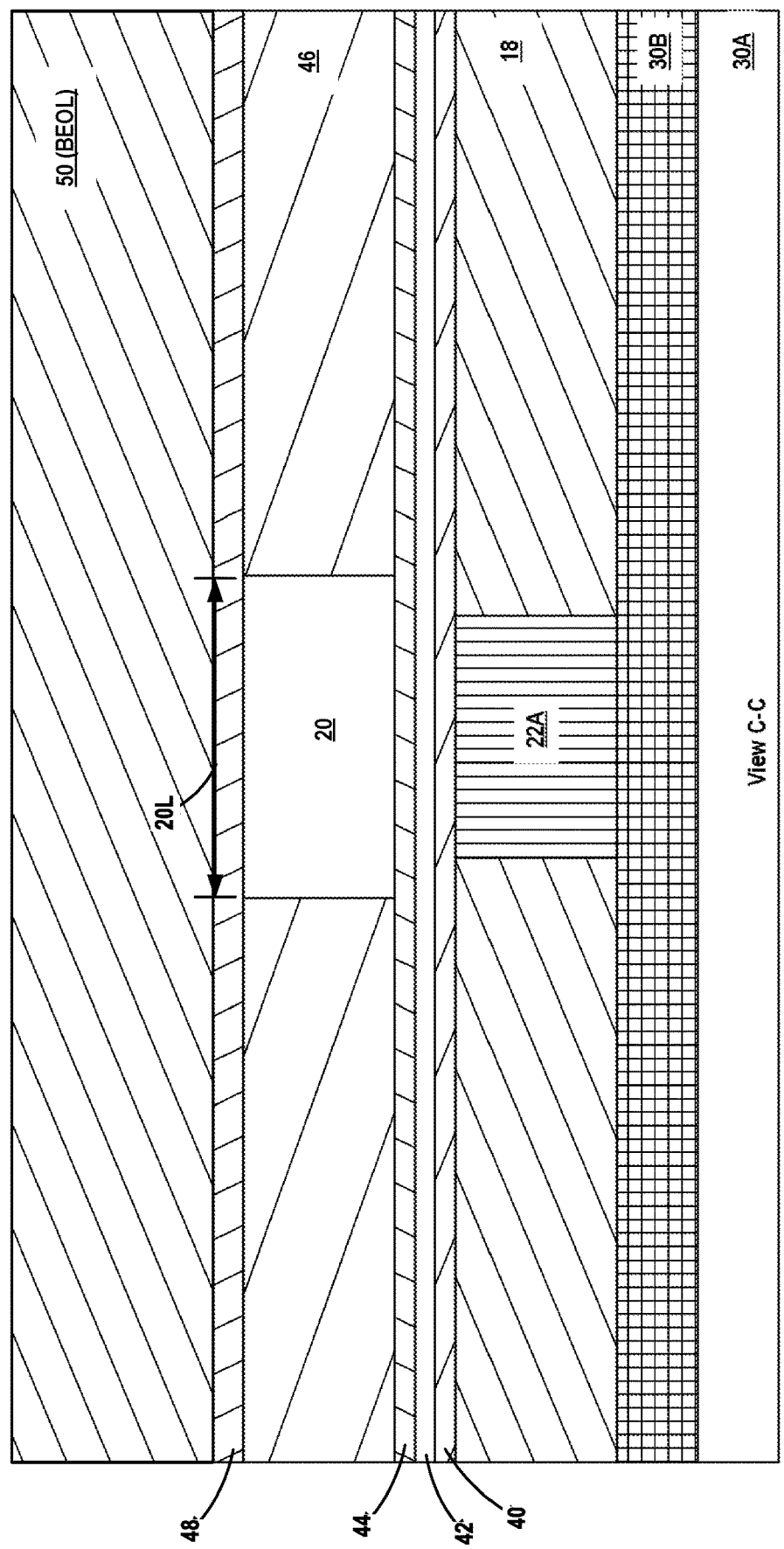
Figure 7:
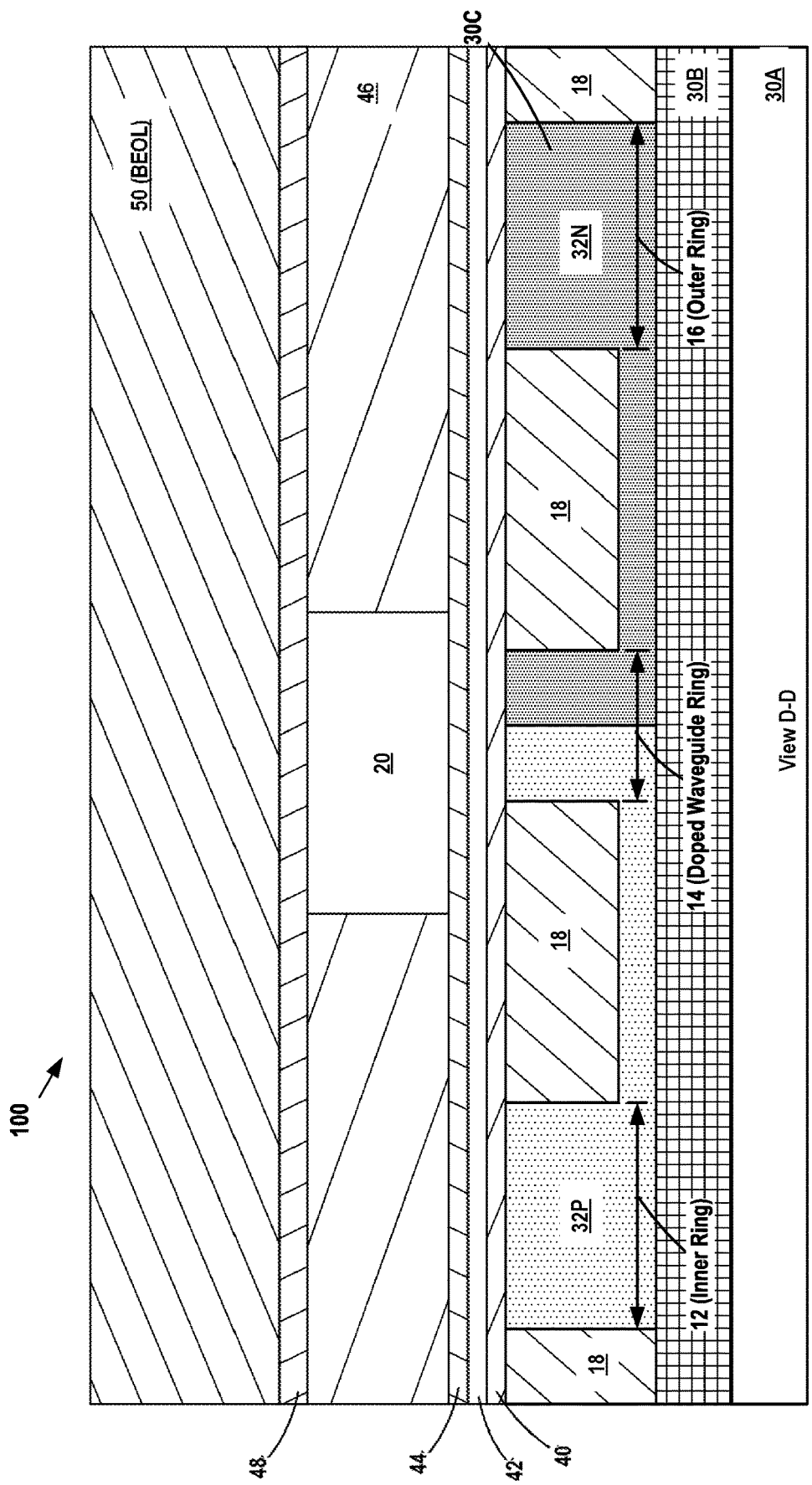
Figure 8:
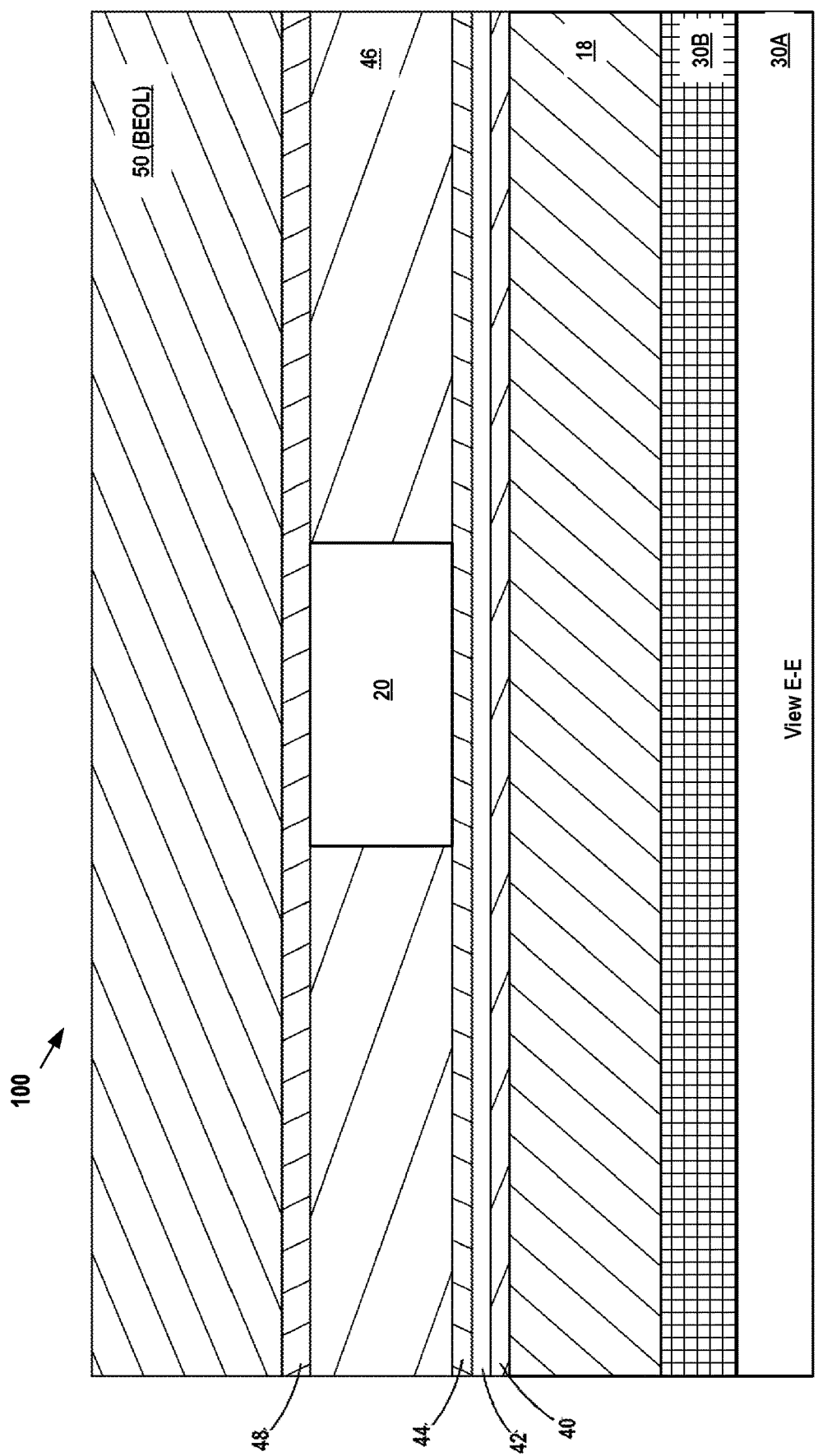

Also depicted in FIG. 5 are various layer of insulating material that are formed above the substrate 30 by performing traditional deposition processes. In one illustrative embodiment, the layers of insulation material 40, 44, and 46 may comprise silicon dioxide, while the layers 42 and 48 comprise silicon nitride. The layers of material 40, 42, 44, 46 and 48 may be formed to any desired thickness.

In some applications, the structure 100 may be formed on an integrated circuit product that includes both optical components and CMOS-based integrated circuits. Such an integrated circuit product also includes various BEOL (back-end-of-line) structures, (e.g., the individual conductive lines, the individual conductive vias, the individual layers of insulating material and individual etch stop layers) are formed in the regions where the CMOS-based integrated circuits are formed. In IC products that include both optical components and CMOS-based integrated circuits, the photonics region is substantially free of individual conductive lines and individual conductive vias similar to those formed in the CMOS region. However, the various BEOL layers of insulating material and BEOL etch stop layers that were formed in the CMOS region will also be formed in the photonics region. In some cases, the BEOL layers of insulating material and BEOL etch stop layers in the photonics region will be removed and replaced with refractive index matching insulating material(s) to ensure optimal optical performance of the optical device. However, FIG. 5 simplistically depicts a representative layer 50 that represents the various BEOL layers of insulating material and BEOL etch stop layers positioned above the layer of insulating material 48.

As noted above, FIG. 6 reflects the cross-sectional view C-C—a cross-sectional view taken through the lower waveguide 22 and the upper bus waveguide 20. As shown therein, in one illustrative embodiment, the upper bus waveguide 20 was formed from a layer of silicon nitride. However, the upper bus waveguide 20 may be made from any material that has a reflective index greater than that of silicon dioxide. The physical dimensions of the upper bus waveguide 20, e.g., the lateral width 20L, the vertical thickness as well as the configuration of the upper bus waveguide 20 when viewed from above may vary depending upon the particular application. For example, in the examples depicted herein, the portions of the upper bus waveguide 20 positioned vertically above the lower waveguide 22 have a tapered configuration, as shown in FIG. 1. The physical size of the upper bus waveguide 20 may be greater than or less than the physical size of the lower waveguide 22. In the example depicted herein, the lateral width 20L of the upper bus waveguide 20 is greater than the lateral width 22L of the lower waveguide 22, but that may not be the case in all applications. In one illustrative example, based upon current-day technology, the lateral width 20L of the upper bus waveguide 20 may be about 500-1000 nm in the case where the upper bus waveguide 20 is made of silicon nitride. Also note that the upper bus waveguide 20 need not have the tapered ends in all applications.

With reference to FIG. 1, in one illustrative embodiment, when viewed from above, portions of the upper bus waveguide 20 may overlay portions of the lower waveguide 22. In such an embodiment, the amount of vertical overlap between the upper bus waveguide 20 and the lower waveguide 22 may vary depending upon the particular application, e.g., a first portion of the upper bus waveguide 20 may overlap the section 22A by about 10-500, while a second portion of the upper bus waveguide 20 and the lower waveguide 22 may overlap the section 22B of the lower waveguide by about 10-500 nm. The amount of vertical overlap of the sections 22A, 22B need not be the same, but that may be the case in some applications. However, as will be appreciated by those skilled in the art after a complete reading of the present application, in some cases, if the lower waveguide 22 is present, there may be no vertical overlay between the upper bus waveguide 20 and the lower waveguide 22. Similarly, if the lower waveguide 22 is present, based upon current-day technology, the vertical spacing between the upper bus waveguide 20 and the lower waveguide 22 may vary depending upon the particular application, e.g., 1-500 nm. Additionally, if the lower waveguide 22 is present, when viewed from above, the upper bus waveguide 20 may not be positioned above any portion of the lower waveguide 22, i.e., the lower waveguide 22 may positioned to the side of a downward projection of the upper bus waveguide 20.

As noted above, FIG. 7 reflects the cross-sectional view D-D—a cross-sectional view taken through the micro-ring modulator 10 and the upper bus waveguide 20. As shown therein, at least a portion of the upper bus waveguide 20 is positioned vertically above at least a portion of the doped waveguide ring 14 and above two portions of the outer ring 16. In one particular example, the upper bus waveguide 20 may be substantially centered above the underlying portion of the doped waveguide ring 14 shown in FIG. 7. In other embodiments, the upper bus waveguide 20 may be placed substantially off-center of the doped waveguide ring 14 and closer to the outer ring 16. In this latter embodiment, the vertical thickness of the outer ring 16 should be reduced to avoid light coupling to the contact regions on the outer ring 16. The vertical spacing between the bottom of the upper bus waveguide 20 and the upper surface of the doped waveguide ring 14 and the upper surface of the outer ring 16 may vary depending upon the particular application, e.g., 1-500 nm.

As noted above, FIG. 8 reflects the cross-sectional view E-E—a cross-sectional view taken through the upper bus waveguide 20.

As noted above, the lower waveguide 22 comprises a first segment 22A and a second segment 22B that are spaced apart from one another. There is also a space between the end of the first segment 22A and the outer ring 16 and a space between the end of the second segment 22B and the outer ring 16. Also, note that the upper bus waveguide 20 is positioned vertically above at least a portion of the first segment 22A, at least a portion of the second segment 22B and at least a portion of the micro-ring modulator 10. A portion of the upper bus waveguide 20 is positioned vertically above the space between the end of the first segment 22A and the outer ring 16 while another portion of the upper bus waveguide 20 is positioned vertically above the space between the end of the second segment 22B and the outer ring 16. The depicted segments 22A and 22B of the lower waveguide 22 are substantially linear line-type structures but, as will be appreciated by those skilled in the art after a complete reading of the present application, the segments 22A, 22B may have any desired configuration when viewed from above.

In further embodiments, the first segment 22A of the lower waveguide 22 comprises a first end, the second segment 22B of the lower waveguide 22 comprises a second end, the upper bus waveguide 20 comprises a third end and a fourth end, wherein at least a portion of the third end of the upper bus waveguide 20 is positioned vertically above at least a portion of the first end of the first segment 22A and at least a portion of the fourth end of the upper bus waveguide 20 is positioned vertically above at least a portion of the second end of the second segment 22B. In the examples depicted herein, the first end, the second end, the third end and the fourth end are all tapered.

In yet a further embodiment, the upper bus waveguide 20 comprises a first portion, a second portion, and a third portion located between the first portion and the second portion, wherein the first portion of the upper bus waveguide 20 is positioned vertically above at least a portion of the first segment 22A of the lower waveguide 22, the second portion of the upper bus waveguide 20 is positioned vertically above at least a portion of the second segment 22B and the third portion of the upper bus waveguide 20 is positioned vertically above a portion of at least one of the inner ring 12, the doped waveguide ring 14 and the outer ring 16 of the micro-ring modulator 10. In even further embodiments, the upper bus waveguide 20 comprises a fourth portion positioned between the first portion and the third portion, wherein the fourth portion of the upper bus waveguide 20 is positioned vertically above a space between the first segment 22A of the lower waveguide 20 and the outer ring 16. In other embodiments, the upper bus waveguide 20 comprises a fifth portion positioned between the second portion and the third portion, wherein the fifth portion of the upper bus waveguide 20 is positioned vertically above a space between the second segment 22B of the lower waveguide 20 and the outer ring 16.

Figure 9:
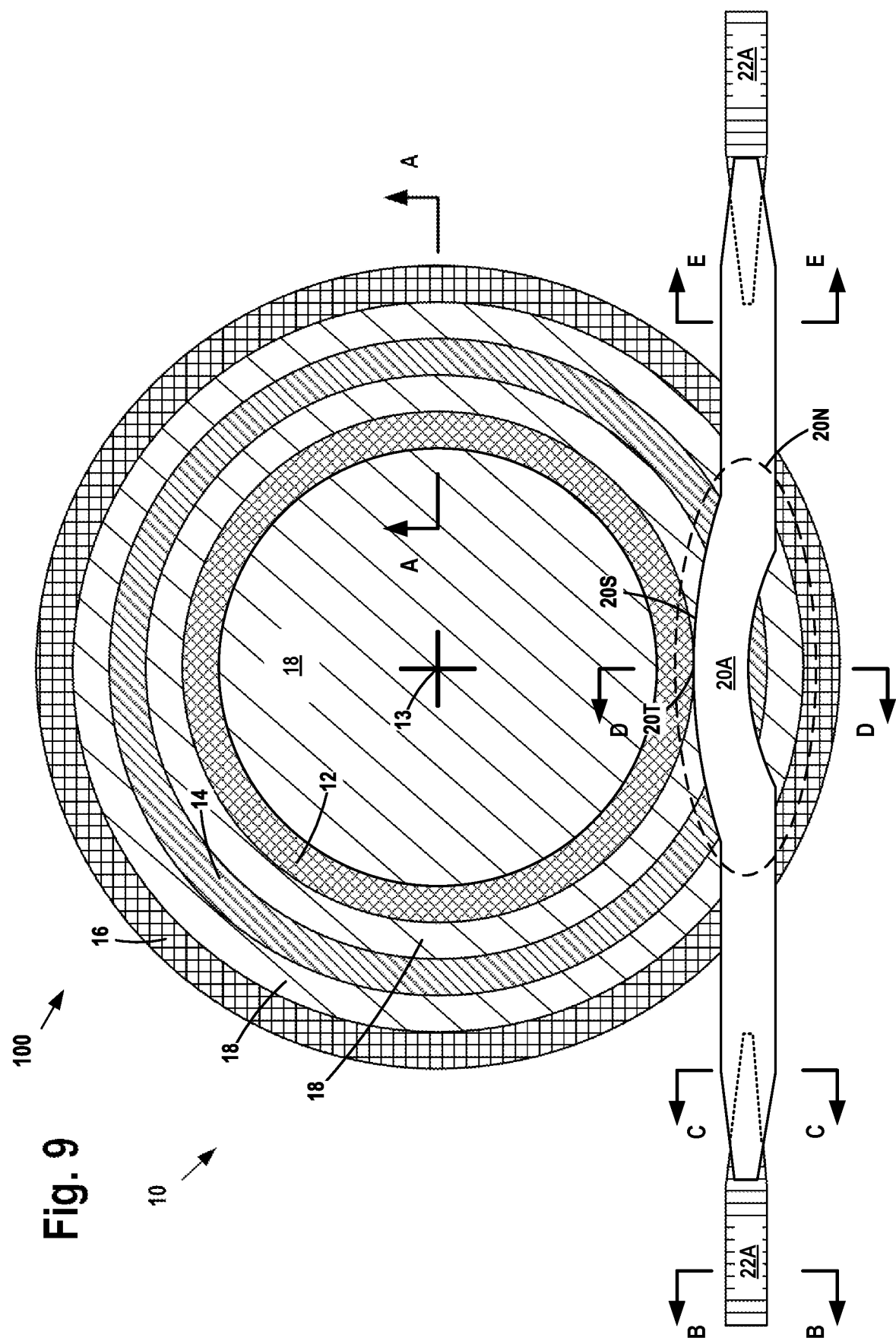

In the embodiment shown in FIG. 1, the upper bus waveguide 20 is a substantially linear line structure. FIG. 9 depicts another embodiment of the structure 100 that includes an upper bus waveguide 20A with a non-linear section 20N. In this example, the non-linear section 20N of the upper bus waveguide 20A is a curved or arcuate section that, when viewed from above, has a surface 20S that is a convex surface relative to the vertical projection of the center 13 of the micro-ring modulator 10. Also depicted in FIG. 9 is the apex 20T of the surface 20S. How close the apex 20T of the surface 20S is positioned toward the center 13 of the micro-ring modulator 10 may vary depending upon the particular application. Moreover, the configuration of the non-linear section 20N may vary such that portions of the non-linear section 20N are positioned vertically above desired portions of the inner ring 12, the middle ring 14 and/or the outer ring 16 so as to enhance device performance depending upon the particular application.

Figure 10:
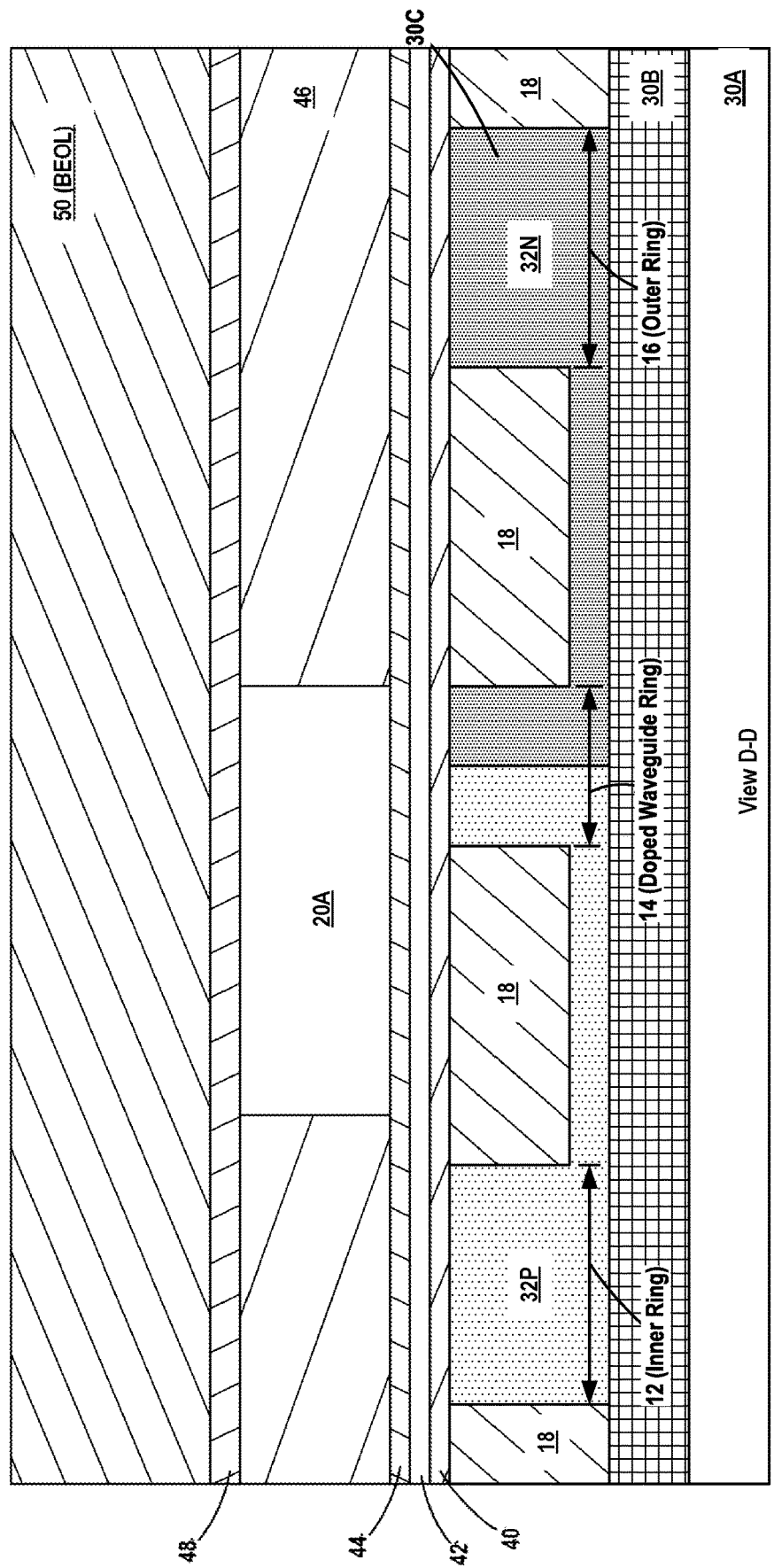

FIG. 10 reflects the cross-sectional view D-D a cross-sectional view taken through the micro-ring modulator 10 and the upper bus waveguide 20A shown in FIG. 9. As shown therein, by providing the upper bus waveguide 20A with the non-linear section 20N, a portion of the upper bus waveguide 20A is moved closer to a vertical projection of the inner ring 12 and farther away from a vertical projection of the outer ring 16. As depicted, at least a portion of the upper bus waveguide 20A is positioned vertically above at least a portion of the doped waveguide ring 14 and above two portions of the outer ring 16. As before, the vertical spacing between the bottom of the upper bus waveguide 20A and the upper surface of the doped waveguide ring 14 and the upper surface of the outer ring 16 may vary depending upon the particular application and then-current technology. By providing the non-linear section 20N on the upper bus waveguide 20A, the performance of the overall structure 100 may be enhanced in that the coupling efficiency between the upper bus waveguide 20 and the lower doped waveguide ring 14 can be better controlled. The amount of the optical power coupled depends on the proximity and overlap length between the upper bus waveguide 20 and the doped waveguide ring 14.

Figure 11:
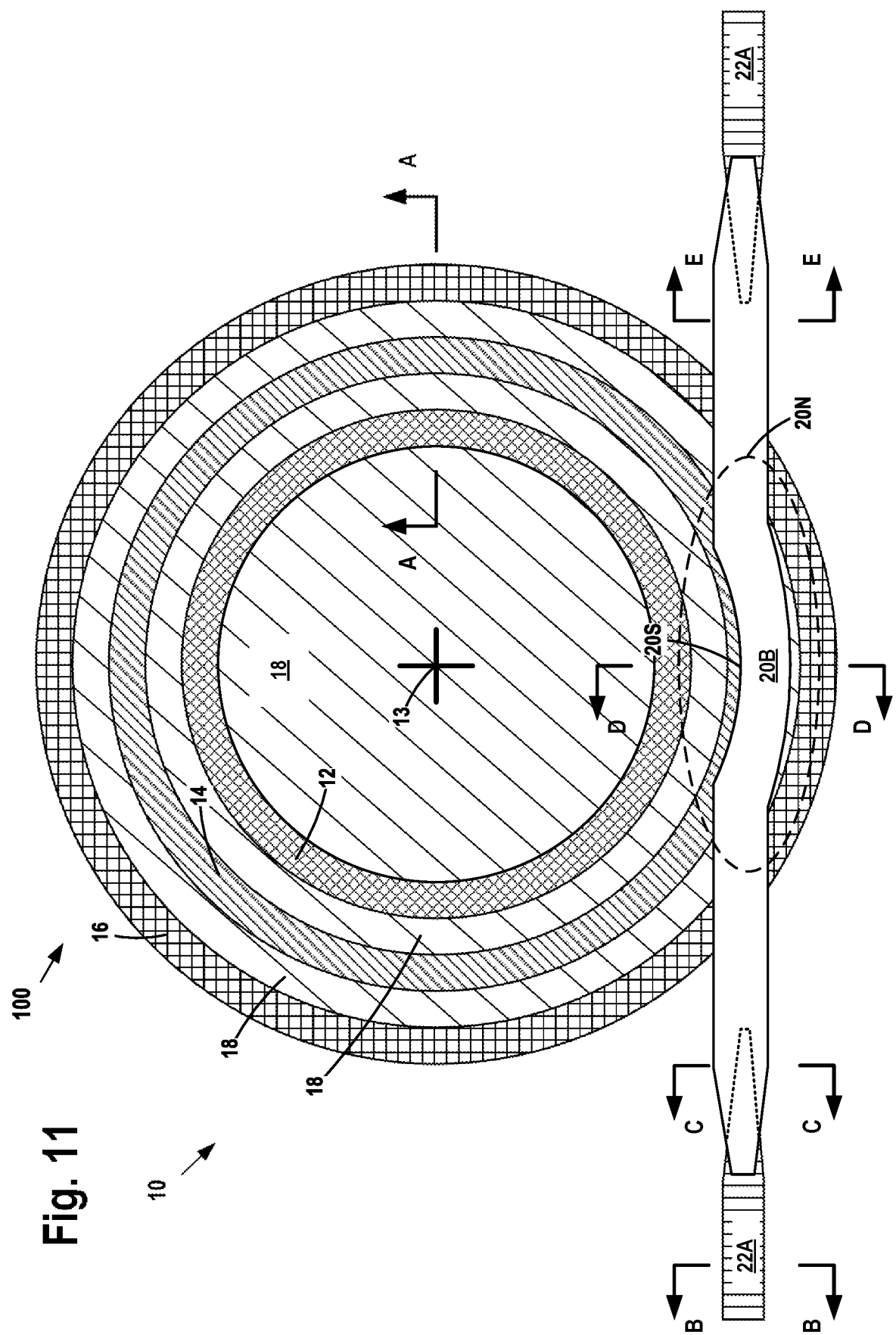
Figure 12:
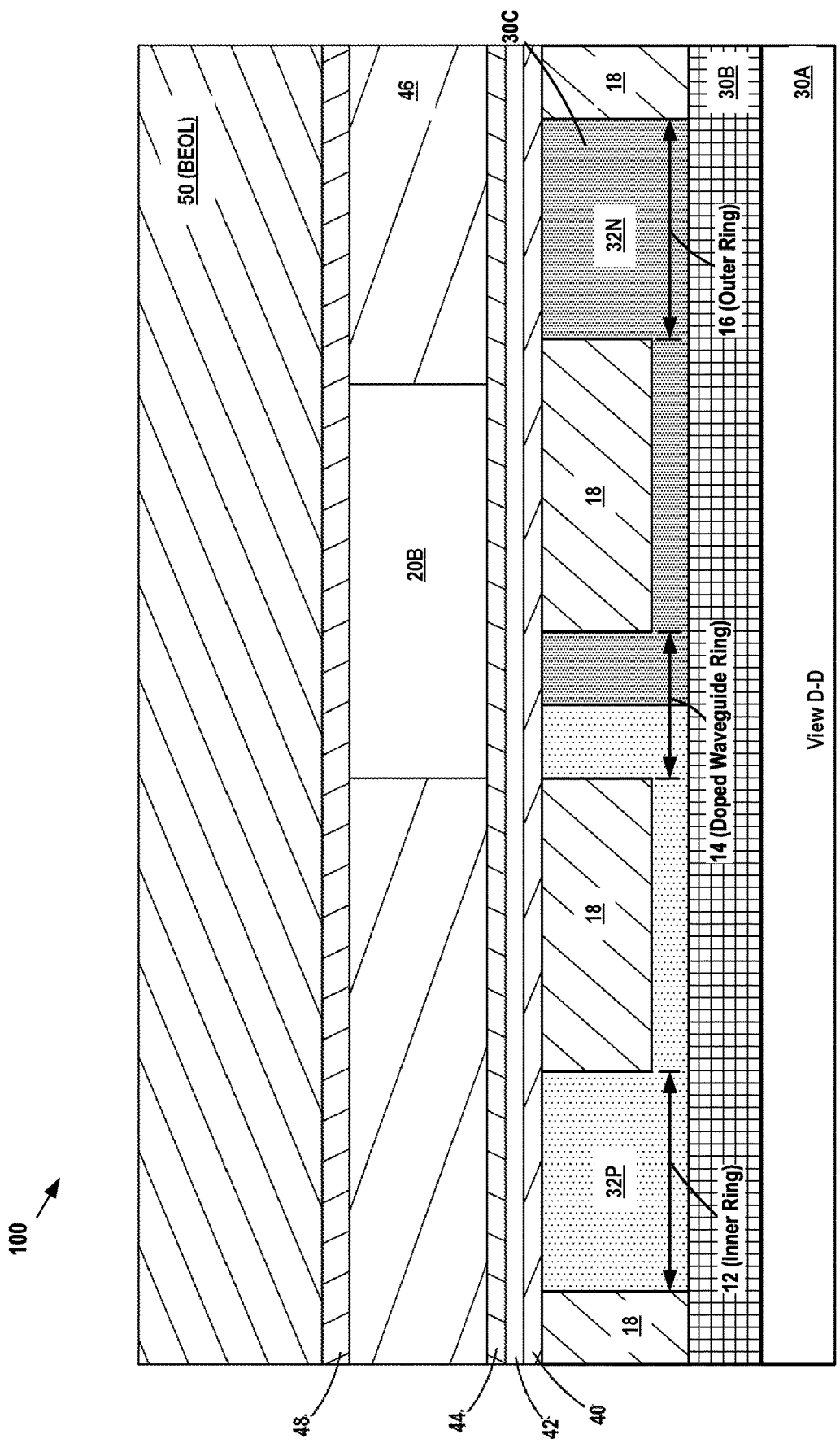

FIGS. 11 and 12 depict another embodiment of an upper bus waveguide 20B with a non-linear section 20N. In this example, the non-linear section 20N of the upper bus waveguide 20B is curved in the opposite direction to that of the non-linear section 20N of the upper bus waveguide 20A shown in FIGS. 9 and 10. That is, when viewed from above, the curved surface 20S of the non-linear section 20N nearest a vertical projection of the center 13 of the micro-ring modulator 10 is a concave surface relative to the center 13 of the micro-ring modulator 10. How far away the surface 20S is positioned from the center 13 of the micro-ring modulator 10 may vary depending upon the particular application. Moreover, the configuration of the non-linear section 20N may vary such that portions of the non-linear section 20N are positioned vertically above desired portions of the inner ring 12, the middle ring 14 and/or the outer ring 16 so as to enhance device performance depending upon the particular application.

FIG. 12 reflects the cross-sectional view D-D—a cross-sectional view taken through the micro-ring modulator 10 and the upper bus waveguide 20B shown in FIG. 11. As shown therein, by providing the upper bus waveguide 20B with the non-linear section 20N, a portion of the upper bus waveguide 20B is moved farther away from a vertical projection of the inner ring 12 and closer to a vertical projection of the outer ring 16. As depicted, at least a portion of the upper bus waveguide 20B is positioned vertically above at least a portion of the doped waveguide ring 14 and above two portions of the outer ring 16. As before, the vertical spacing between the bottom of the upper bus waveguide 20B and the upper surface of the doped waveguide ring 14 and the upper surface of the outer ring 16 may vary depending upon the particular application. As before, by providing the non-linear section 20N on the upper bus waveguide 20B, the performance of the overall structure 100 may be enhanced in that the long overlap region of the upper bus waveguide 20 and the doped waveguide ring 14 can result in a significant amount of coupling optical power. Accordingly, the coupling efficiency can be precisely controlled depending on the application requirements. Due to the close vertical proximity between the upper bus waveguide 20 and the doped waveguide ring 14, such an approach can provide significantly higher coupling values in comparison to other known solutions, i.e., coupling between two waveguides on the same level.

As will be appreciated by those skilled in the art after a complete reading of the present application, positioning the upper bus waveguide 20 at a level above the lower waveguide 22 and the micro-ring modulator 10 and forming the lower waveguide 22 such that it terminates prior to engaging the outer ring 16 permits the inner ring 12, the middle ring 14 and the outer ring 16 of the micro-ring modulator 10 to be formed as continuous rings of material. As shown in FIG. 13 (with the upper bus waveguide 20 omitted for clarity), such a configuration also allows the formation of a simplistically depicted heater structure 50 all around the micro-ring modulator 10, i.e., a first portion 50A of the heater structure 50 may be positioned within the inner ring 12 and a second portion 50B of the heater structure 50 may be positioned all around the outer circumference of the outer ring 16. The structure, function and operations of such a heater structure 50 are well known to those skilled in the art. In one illustrative embodiment, the heat generated by the heater structure 50 may be based upon electrical resistance heating. Various electrical connects to the heater structure 50 operating on electrical resistance heating principles are not shown in the drawings. Operations of the heater structure 50 may improve the thermal stability of the micro-ring modulator 10.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is there-fore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:

1. A device, comprising:
a micro-ring modulator that comprises an inner ring, an outer ring and a doped waveguide ring positioned between the inner ring and the outer ring; and
an upper bus waveguide that is positioned vertically above at least a portion of the doped waveguide ring and at least a portion of the outer ring,
a lower waveguide, said lower waveguide comprising a first segment and a second segment that are spaced apart from one another, wherein the upper bus waveguide is also positioned vertically above at least a portion of the first segment and above at least a portion of the second segment,
wherein the device further comprises a first heater structure positioned within the inner ring and a second heater structure positioned around an entire outer circumference of the outer ring.

2. The device of claim 1, wherein the upper bus waveguide comprises:
a first portion that is positioned vertically above a space between the first segment of the lower waveguide and the outer ring; and
a second portion that is positioned vertically above a space between the second segment of the lower waveguide and the outer ring.

3. The device of claim 1, wherein, when viewed from above, the upper bus waveguide is a substantially linear line-type structure.

4. The device of claim 1, wherein, when viewed from above, the upper bus waveguide comprises a non-linear section.

5. The device of claim 4, wherein the non-linear section is an arcuate section.

6. The device of claim 4, wherein at least a portion of the non-linear section is positioned vertically above a portion of the doped waveguide ring.

7. The device of claim 1, wherein the first segment of the lower waveguide comprises a first end, the second segment of the lower waveguide comprises a second end, the upper bus waveguide comprises a third end and a fourth end, wherein at least a portion of the third end is positioned vertically above at least a portion of the first end and at least a portion of the fourth end is positioned vertically above at least a portion of the second end.

8. The device of claim 7, wherein the first end, the second end, the third end and the fourth end are tapered.

9. The device of claim 1, wherein the upper bus waveguide is vertically spaced apart from a portion of at least one of the inner ring, the doped waveguide ring and the outer ring of the micro-ring modulator.

10. A device, comprising:
a micro-ring modulator comprising an inner ring, an outer ring and a doped waveguide ring positioned between the inner ring and the outer ring;
a lower waveguide, the lower waveguide comprising a first segment and a second segment that are spaced apart from one another; and
an upper bus waveguide comprising a first portion, a second portion, and a third portion located between the first portion and the second portion, wherein the first portion is positioned vertically above at least a portion of the first segment, the second portion is positioned vertically above at least a portion of the second segment and the third portion is positioned vertically above and vertically spaced apart from a portion of at least one of the inner ring, the doped waveguide ring and the outer ring of the micro-ring modulator,
wherein the device further comprises a first heater structure positioned within the inner ring and a second heater structure positioned around an entire outer circumference of the outer ring.

11. The device of claim 10, wherein the lower waveguide, the inner ring, the outer ring and the doped waveguide ring comprise silicon and the upper bus waveguide comprises silicon nitride.

12. The device of claim 10, wherein the upper bus waveguide comprises:

a fourth portion positioned between the first portion and the third portion, wherein the fourth portion is positioned vertically above a space between the first segment of the lower waveguide and the outer ring; and a fifth portion positioned between the second portion and the third portion, wherein the fifth portion is positioned vertically above a space between the second segment of the lower waveguide and the outer ring.

13. The device of claim 10, wherein, when viewed from above, the upper bus waveguide comprises a non-linear section.

14. The device of claim 13, wherein the non-linear section is an arcuate section.

15. The device of claim 13, wherein at least a portion of the non-linear section is positioned vertically above a portion of at least one of the inner ring, the doped waveguide ring and the outer ring of the micro-ring modulator.

* * * * *